Figure 1:
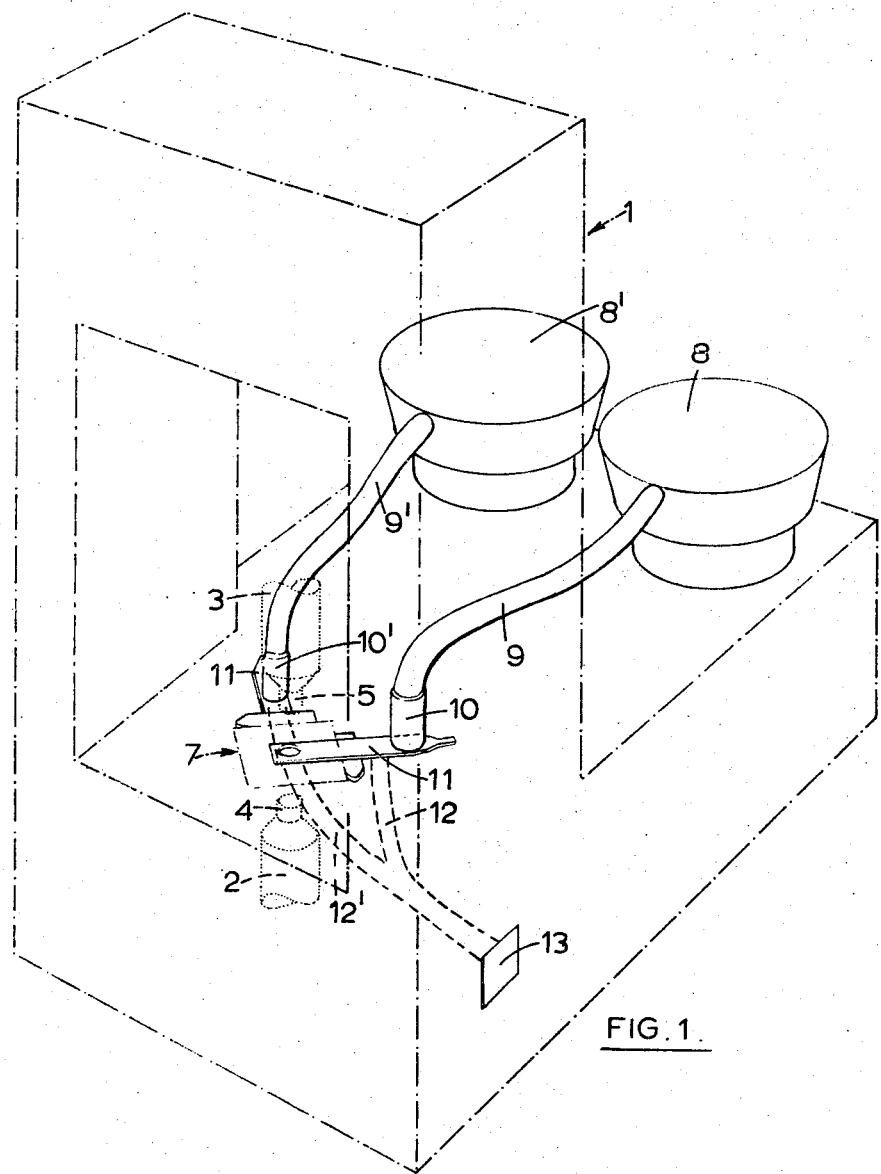

United States Patent [19]

Baugh et al.

[11] 3,848,444

[45] Nov. 19, 1974

[54] FEED MECHANISMS

[75] Inventors: Raymond Ernest Baugh, Walsall; John Edward Plaister, Lapworth, both of England

[73] Assignee: Taylor & Challen Limited, Birmingham, England

[22] Filed: Dec. 27, 1972

[21] Appl. No.: 319,059

[52] U.S. Cl............................ 72/10, 72/424, 72/427, 214/1 BB
[51] Int. Cl........................ B21b 37/00, B21d 43/20
[58] Field of Search ............... 72/10, 38, 424, 427; 214/1 BB

[56] References Cited
UNITED STATES PATENTS
3,239,079   3/1966   Leavesley .................... 214/1 BB

*Primary Examiner*—C. W. Lanham
*Assistant Examiner*—Robert M. Rogers
*Attorney, Agent, or Firm*—Scrivener Parker Scrivener and Clarke

[57] ABSTRACT

A feed mechanism suitable for a coining press comprising two or more feed members which are adapted to reciprocate along respective longitudinal axes and which reciprocate in synchronism so that each in turn feeds a workpiece from an associated feed station to a work station which is common to all of the feed members. Preferably, each feed member is adapted so as to feed workpieces one at a time from the feed station to the work station and back to a separate unloading station associated with the feed member, the feed station and unloading station for each feed member lying on the same side of the work station. Further each feed member is preferably a plate with a hole therethrough to receive a workpiece in the form of a flat blank, and the blank is worked on through the hole at the work station and is withdrawn in the hole to the unloading station where it is removed by a blast of air. Most simply, the workpiece is blown downwards and falls from the hole, a shutter being provided below the feed plate at the work station which opens in synchronism with the movement of the feed plate to allow the workpieces to be so removed.

9 Claims, 4 Drawing Figures

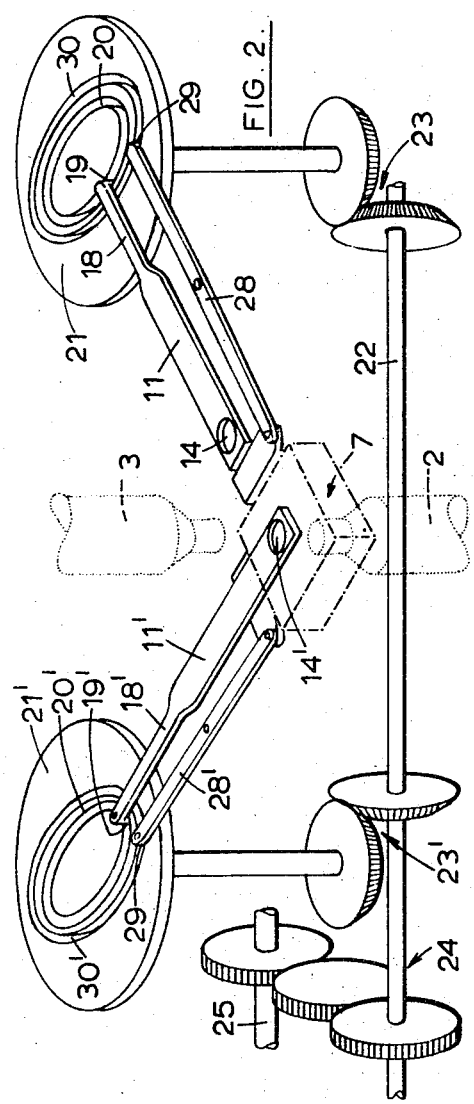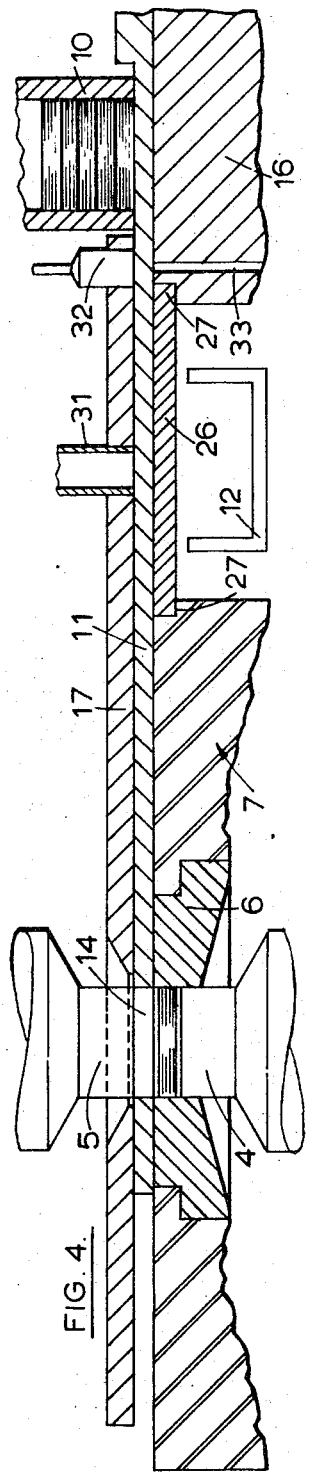

FEED MECHANISMS

This invention relates to a feed mechanism, and in particular a high speed feed mechanism for a coining press.

Linear feed mechanisms are known in coining presses in which a slide or a pair of grippers reciprocates to feed blanks to and from a pair of coining dies. Typically, the blanks are fed in successive steps to and from the dies in one direction so that the blanks are moved from a feed station on one side of the dies to a delivery station on the diametrically opposite side of the dies. A disadvantage of these linear feed mechanisms is that the speed at which they can operate is restricted, the maximum feed rate which they can achieve being of the order of 250 blanks per minute. Because of this disadvantage rotary per minute. Because of this disadvantage rotary feed mechanisms have been preferred as it has been found that they can achieve much higher feed rates of the order of 400 blanks per minute. An example of a rotary feed mechanism comprising a rotary index plate with notches in its periphery to receive blanks is disclosed in British Pat. No. 1,238,056. However, rotary feed mechanism suffer from the disadvantage that they are generally much more complex and more difficult and costly to manufacture than linear feed mechanisms.

An object of the present invention is to provide a linear feed mechanism which retains the basic simplicity of this type of feed mechanism but which can operate at comparable speeds to the rotary type of feed mechanism.

According to the present invention we propose a feed mechanism comprising two or more feed members which are adapted to reciprocate along respective longitudinal axes and which reciprocate in synchronism so that each in turn feeds a workpiece from an associated feed station to a work station which is common to all of the feed members. Employing a plurality of feed members in this way and operating them in synchronism enables new workpieces to be fed to the work station, even while the previously inserted workpiece is being removed, and thus ensures that a high feed rate can be achieved.

Preferably, each feed member is adapted so as to feed workpieces one at a time from the feed station to the work station and back to a separate unloading station associated with the feed member, the feed station and unloading station for each feed member lying on the same side of the work station. Further, each feed member is preferably a plate with a hole therethrough to receive a workpiece in the form of a flat blank, and the blank is worked on through the hole at the work station and is withdrawn in the hole to the unloading station and where it is removed by a blast of air. Most simply, the workpiece is blown downwards and falls from the hole, a shutter being provided below the feed plate at the unloading station which opens in synchronism with the movement of the feed plate to allow the workpieces to be so removed.

The invention will now be described by way of example with reference to the accompanying drawings which show a coining press feed mechanism according to the invention.

Figure 3:
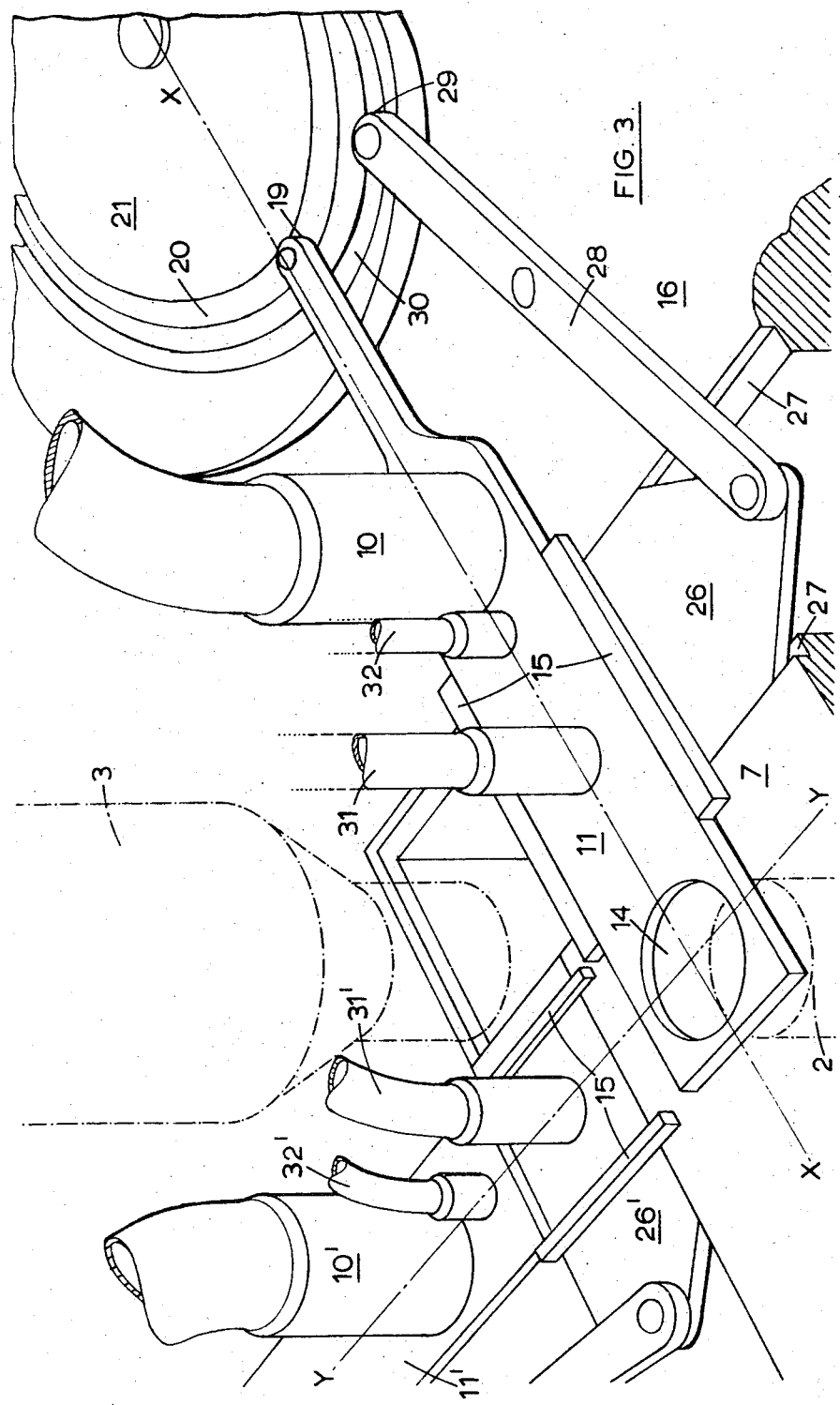

FIG. 1 is a schematic perspective view of a coining press showing part of the feed mechanism, FIG. 2 is a schematic perspective view showing the drive means for the feed members in the feed mechanism, FIG. 3 is an enlarged perspective view of the feed mechanism and FIG. 4 is a vertical section along the axis of reciprocation X—X of a feed member in FIG. 3.

The coining press 1 shown in simple outline in FIG. 1 comprises two vertically aligned die support assemblies 2,3, the lower one 2 of which supports a lower die 4 with its face uppermost and the upper one 3 of which supports an upper die 5 with its face lowermost and opposite the lower die 4. Coin blanks are fed between the two dies 4,5 one at a time and are coined therebetween in an annular collar plate 6 which is spring supported in a collar plate assembly 7. The lower die assembly remains stationary during coining and the upper die assembly moves downwards to apply the coining force to the coin blanks.

The coin blanks are fed between the dies by a feed mechanism comprising two feed hoppers 8,8' in which coin blanks are stored and from which they are fed via chutes 9,9' to vertical stacker tubes 10,10'. A reciprocating feed member 11, 11' moves the blanks one at a time from the bottom of a respective stacker tube 10,10' to the dies and, once coined, back to an unloading station where the coined blank is released into a respective outlet chute 12,12' through which the coined blanks pass to an outlet 13 to be collected.

That part of the feed mechanism comprising the feed members 11,11' is shown in more detail in FIG. 3. Each feed member takes the form of a horizontal plate with a hole 14,14' formed in it to receive a blank. Each feed plate 11,11' is supported at its sides by a pair of guides 15,15' which guide the plates to move along respective horizontal axes X—X, Y—Y which are mutually perpendicular to one another and which cross at the vertical axis of the two die assemblies 2,3. The feed plates are also supported between upper and lower surfaces defined by the collar plate assembly 7, press frame member 16, and a cover plate 17 which has been omitted for reasons of clarity from FIG. 3 but is shown in the section of FIG. 4. Each feed plate 11,11' is reciprocated along its respective axis X—X, Y—Y by a bar 18,18' which is rigid with the plate 11,11' and which carries a cam roller 19,19' on its outer end which engages in a cam channel 20,20' in a cam disc 21,21' (see FIGS. 2,3). The two cam discs 21,21' are driven in synchronism as between themselves through a common drive shaft 22 and a respective pair of similar bevelled gears 22,23'. The shaft 22 is driven through gearing 24' by a shaft 25 associated with the die actuating mechanism so that rotation of the cam discs and thus the feed action of the feed plates 11,11' is synchronised with the coining action of the dies.

The two feed plates 11,11' are each reciprocated in a similar manner by their respective cam plates 21,21' but their reciprocating cycles are displaced in phase relative to one another so that they operate alternately to feed a blank from the bottom of the stacker tube 10, to the dies 4,5 and back to an unloading station. The operating cycle of each feed plate can be understood with reference to FIG. 4. When the feed plate 11 is at the extreme right-hand end of its cycle, the hole 14 lies below the stacker tube 10 and the lowermost coin blank drops into the hole. The feed plate 11 moves forwards with the blank until it reaches the extreme lefthand end of its cycle (as seen in FIG. 4) at which the hole 14 is aligned with the dies 4,5 and the blank drops from the hole into the bore in the collar plate 6 and lies on the face of the lower die 4. The upper die descends and coins the blank and the lower die lifts the coined blank from the collar plate 6 back into the hole 14. The feed plate then withdraws the coined blank to the unloading station.

The unloading station lies between the dies and the stacker tube and comprises the shutter plate 26 below the feed plate 11. The shutter plate 26 is guided in guide shoulders 27 to move transversely of the feed plate 11 and is moved in synchronism with the latter via a centre pivoted lever 28 which carries a cam roller 29 engaging a cam channel 30 in the cam plate 21 associated with the feed plate 11. The shutter 26 is positioned to close the lower end of the hole 14 in the feed plate when the latter moves forward with a new blank, but the shutter moves and is clear of the hole 14 when the feed plate moves back on the return stroke with the coined blank so that the coined blank can be ejected downwards from the hole into the outlet chute 12. In order to ensure that the coined blank is removed from the hole 14 a jet of air is supplied from a tube 31 with its lower open end projecting through and supported in the cover plate 17 so as to overlie the coined blank at the unloading station.

After the coined blank has been removed at the unloading station the feed plate 11 continues to move back to the extreme right-hand end of its cycle to be loaded with another new blank.

The feed plate 11' is provided with a similar unloading station comprising an air tube 31' and a shutter 26' operated by a lever 28', cam roller 29' and cam channel 30' in cam disc 21'. Further, the feed plate 11' performs a similar cycle to the feed plate 11 but one feed plate moves to feed a new blank forward while the other removes a coined blank and the one feed plate drops the new blank into the collar plate 6 while the other positions the coined blank at the unloading station to be blown from the feed plate.

In order to check that the hole in each feed plate is loaded with a new blank at the stacker tube, pneumatic sensor means is provided between each stacker tube and shutter comprising an air tube 32,32' mounted with its lower open end projecting through and supported in teh cover plate 17, and an air passage 33,33' through the frame member 16 and vertically aligned with the air tube 32,32'. This air tube and air passage are isolated from one another for the greater part of a cycle by the respective feed plate and, in particular, will be isolated from one another at the beginning of a cycle by a new blank received in the hole of the feed plate. If, however, the hole 14,14' does not contain a new blank it completes an air passage between the air tube 31,31' and air passage 33,33' and air flow results which can be used to operate warning means or to stop the press and prevent damage to the dies. These air tubes 31,31' and air passages 33,33' can also be used in a similar way to sense whether or not each coined blank is successfully removed from the feed plate at the unloading station on the return stroke.

Although in the feed mechanism described above the two reciprocating feed members are disposed perpendicular to one another, it will be appreciated that in other embodiments of the invention they may be aligned along a common axis on diametrically opposite sides of the dies. If there are three or more feed members these can be spaced about the dies in any convenient manner. Also, instead of the feed members each taking the form of a plate with a hole to receive a blank, they may each take the form of a pair of gripper jaws which operate to grip and release blanks as required at the feed station, coining station and unloading station. Other actuation means besides the cam plates may be provided to operate the feed members. Also, the actuation means shown comprising the cam plates may be modified so that both cam rollers 19,29 ride in a common cam channel instead of the separate cam channels 20,30.

We claim:

1. A feed mechanism comprising two or more separate feed members which are adapted to reciprocate along respective longitudinal axes, a separate feed station positioned along the longitudinal axis of each feed member and providing a supply of workpieces to that feed member, a work station positioned at the meeting of said longitudinal axes to receive workpieces from all of said feed members, a separate unloading station positioned along the longitudinal axis of each feed member and lying on the same side of the work station as the respective feed station, and actuation means which reciprocates the feed members in synchronism so that each in turn feeds a workpiece from a respective feed station to said work station while the previous feed member to feed a work piece to the work station removes a work piece from the work station to the unloading station.

2. A feed mechanism according to claim 1 in which each feed member comprises a plate-like member formed with a hole therethrough to receive a workpiece.

3. A feed mechanism according to claim 2 in which said plate-like feed member lies horizontally and the feed station comprises a stacker tube which delivers work pieces into the hole in the feed member.

4. A feed mechanism comprising two or more separate feed members which take the form of horizontal plate-like feed members which are adapted to reciprocate along respective longitudinal axes, a separate feed station positioned along the longitudinal axis of each feed member and comprising a stacker tube which delivers workpieces to the hole in the feed member, a work station positioned at the meeting of said longitudinal axes to receive work-pieces from all of said feed members, a separate unloading station which is positioned along the longitudinal axis of each feed member between the feed station and work station and comprises a shutter which underlies the feed member and can be moved to uncover said hole in the latter to allow the escape of a workpiece downwards through the hole, and actuation means which reciprocates the feed members in synchronism so that each in turn feeds a workpiece from a respective feed station to said work station.

5. A feed mechanism according to claim 4 in which the unloading station further comprises an air tube which is provided above the plate-like feed member with a downwardly opening lower end to direct a blast of air to remove workpieces from the hole in the feed member.

6. A feed mechanism according to claim 5 in which the plate-like feed member and associated shutter are operated in synchronism from a common rotary cam plate.

7. A feed mechanism according to claim 2 which includes pneumatic means to sense whether or not a workpiece is present in said hole through the feed member comprising an air tube on one side of the feed member and an air passage on the opposite side of the feed member so that said hole completes an air flow path between the air tube and air passage if a workpiece is not present in the hole.

8. A coining press comprising a pair of opposed coining dies and fitted with a feed mechanism as claimed in claim 1, including means for synchronizing operation of the feed members with operation of the dies of the coining press.

9. A feed mechanism comprising two separate feed members which are adapted to reciprocate along respective longitudinal axes inclined to one another, a separate feed station positioned along the longitudinal axis of each feed member and providing a supply of workpieces to that feed member, a work station positioned at the meeting of said longitudinal axes to receive workpieces from each of said feed members, a separate unloading station positioned along the longitudinal axis of each feed member and lying on the same side of the work station as the respective feed station, and actuation means which reciprocates the feed members in synchronism so that each in turn feeds a workpiece from a respective feed station to said work station while the previous feed member to feed a work piece to the work station removes a work piece from the work station to the unloading station.

* * * * *